(12) United States Patent
Shih

(10) Patent No.: US 10,600,213 B2
(45) Date of Patent: Mar. 24, 2020

(54) METHOD AND APPARATUS FOR COLOR-PRESERVING SPECTRUM RESHAPE

(71) Applicant: Focal Sharp, Inc., Los Angeles, CA (US)

(72) Inventor: Kuang-Tsu Shih, New Taipei (TW)

(73) Assignee: Focal Sharp, Inc., Los Angeles, CA (US)

( * ) Notice: Subject to any disclaimer, the term of this patent is extended or adjusted under 35 U.S.C. 154(b) by 0 days.

(21) Appl. No.: 15/441,614

(22) Filed: Feb. 24, 2017

(65) Prior Publication Data

US 2017/0249755 A1    Aug. 31, 2017

Related U.S. Application Data

(60) Provisional application No. 62/300,794, filed on Feb. 27, 2016.

(51) Int. Cl.
*G06T 11/00* (2006.01)
*G09G 3/20* (2006.01)

(52) U.S. Cl.
CPC .......... *G06T 11/001* (2013.01); *G09G 3/2003* (2013.01); *G09G 2320/029* (2013.01);
(Continued)

(58) Field of Classification Search
CPC ......... G09G 3/2003; G09G 2320/0242; G09G 2320/029; G09G 2320/0666; G09G 2320/0693; G09G 2320/06; G09G 2340/06; G06T 11/001; G06B 6/29361;
G02F 2201/086; G02B 5/20; G02B 5/22; G02B 5/28; G02B 5/24; G02B 5/46; G02B 5/265; G02B 5/283; G02B 5/284; G02B 5/287; G02B 5/288; G02B 5/1833; G02B 5/1838;
(Continued)

(56) References Cited

U.S. PATENT DOCUMENTS 6,307,566 B1 * 10/2001 Hill ...................... G06T 3/4015
345/613
8,045,252 B2 * 10/2011 Chui ...................... G02B 26/001
359/238

(Continued)

FOREIGN PATENT DOCUMENTS

EP    1536627 A2    6/2005

OTHER PUBLICATIONS

PCT, International Search Report and Written Opinion for PCT/US17/19543, dated May 16, 2017, 9 pages.
(Continued)

*Primary Examiner* — Devona E Faulk
*Assistant Examiner* — Charles L Beard
(74) *Attorney, Agent, or Firm* — Zhong Law, LLC

(57) ABSTRACT

A system include an light emitter to generate a primary light, a filter to filter the primary light to substantially remove a spectrum energy in a wavelength band, a display device to present visual content using the filtered primary light, and a processing device to receive a visual content, calculate, in view of the filtered primary light, a metamer of the visual content, and provide, to the display device, the metamer of the visual content to display in view of the filtered light.

22 Claims, 7 Drawing Sheets
(2 of 7 Drawing Sheet(s) Filed in Color)

(52) U.S. Cl.
CPC .............. *G09G 2320/0242* (2013.01); *G09G 2320/0666* (2013.01)

(58) Field of Classification Search
CPC ................... G02B 5/3075; G02B 5/3091; G02B 17/0892; G02B 27/4294; G02B 5/208; G02B 5/286; G02B 6/102
See application file for complete search history.

(56) References Cited

U.S. PATENT DOCUMENTS

| | | | |
|---|---|---|---|
| 8,210,678 B1* | 7/2012 | Farwig | G02B 5/22 351/159.65 |
| 9,057,887 B1* | 6/2015 | Jaglan | G02C 7/107 |
| 9,240,836 B1* | 1/2016 | Chen | G01M 11/3136 |
| 9,836,828 B2* | 12/2017 | Jones | G06T 15/04 |
| 9,953,615 B2* | 4/2018 | Kwon | G09G 5/02 |
| 10,049,643 B1* | 8/2018 | Wu | G09G 5/02 |
| 2004/0114114 A1* | 6/2004 | Yano | G02B 5/283 353/84 |
| 2004/0151895 A1* | 8/2004 | Itoh | B32B 7/02 428/327 |
| 2004/0212766 A1* | 10/2004 | Kashima | G02B 5/3016 349/117 |
| 2004/0251821 A1* | 12/2004 | Cok | G09G 3/3216 313/506 |
| 2005/0012755 A1* | 1/2005 | Dresevic | A63B 69/205 345/581 |
| 2005/0012870 A1* | 1/2005 | Hirata | H04N 9/3105 349/8 |
| 2005/0258727 A1* | 11/2005 | Kanoh | G02B 5/20 313/110 |
| 2005/0278762 A1* | 12/2005 | Leddy | H04L 12/2801 725/95 |
| 2006/0066525 A1* | 3/2006 | Childs | G09G 3/3233 345/76 |
| 2006/0067633 A1* | 3/2006 | Gally | G02B 26/001 385/129 |
| 2007/0171290 A1* | 7/2007 | Kroger | G06T 3/4015 348/272 |
| 2007/0188711 A1* | 8/2007 | Sharp | G02F 1/133621 353/8 |
| 2007/0195519 A1* | 8/2007 | Shin | G02B 6/0055 362/125 |
| 2007/0200806 A1* | 8/2007 | Vestal | G09G 3/2025 345/85 |
| 2007/0247567 A1* | 10/2007 | Sato | G02B 5/286 349/96 |
| 2008/0030648 A1* | 2/2008 | Morita | G02F 1/133611 349/64 |
| 2008/0055523 A1* | 3/2008 | Nishihara | G02F 1/133504 349/96 |
| 2008/0100776 A1* | 5/2008 | Miyachi | C09K 19/18 349/69 |
| 2008/0170039 A1* | 7/2008 | Shin | G09F 9/33 345/170 |
| 2008/0180954 A1* | 7/2008 | Ramos | G02B 5/22 362/293 |
| 2008/0303993 A1* | 12/2008 | Kuo | G02F 1/133555 349/114 |
| 2009/0033676 A1* | 2/2009 | Cybart | G09G 3/2003 345/589 |
| 2009/0046221 A1* | 2/2009 | Miyachi | C09K 19/18 349/69 |
| 2009/0058873 A1* | 3/2009 | Brown Elliott | G06T 5/009 345/589 |
| 2010/0085361 A1* | 4/2010 | Kim | G06T 5/008 345/428 |
| 2010/0315693 A1* | 12/2010 | Lam | G02B 5/23 359/241 |
| 2011/0032277 A1* | 2/2011 | Lee | G09G 3/3225 345/690 |
| 2011/0279721 A1* | 11/2011 | McMahon | H04N 5/345 348/302 |
| 2012/0069551 A1* | 3/2012 | Bues | G02F 1/133603 362/97.2 |
| 2012/0147163 A1* | 6/2012 | Kaminsky | G09G 5/028 348/62 |
| 2012/0147243 A1* | 6/2012 | Townsend | H04N 9/045 348/333.02 |
| 2012/0212515 A1* | 8/2012 | Hamer | G09G 3/2003 345/690 |
| 2012/0287147 A1* | 11/2012 | Brown Elliott | G09G 5/02 345/593 |
| 2012/0287148 A1* | 11/2012 | Brown Elliott | G09G 5/02 345/593 |
| 2012/0287168 A1* | 11/2012 | Botzas | G09G 3/3413 345/690 |
| 2013/0050293 A1* | 2/2013 | Feng | G09G 3/3413 345/690 |
| 2013/0070183 A1* | 3/2013 | Watanabe | G02B 5/208 349/70 |
| 2013/0070208 A1* | 3/2013 | Nakanishi | G03B 21/16 353/31 |
| 2013/0208201 A1* | 8/2013 | Satoh | G02F 1/1334 349/33 |
| 2013/0215360 A1* | 8/2013 | Pollack | G09G 3/3413 349/61 |
| 2013/0258203 A1* | 10/2013 | Atkins | G09G 5/02 348/708 |
| 2013/0271811 A1* | 10/2013 | Lam | E06B 9/24 359/266 |
| 2013/0278650 A1* | 10/2013 | Takahashi | G09G 3/3413 345/691 |
| 2013/0278989 A1* | 10/2013 | Lam | B60J 3/04 359/275 |
| 2014/0104322 A1* | 4/2014 | Xu | G09G 3/3611 345/690 |
| 2014/0293025 A1* | 10/2014 | Farnam | G02B 27/2228 348/54 |
| 2014/0363683 A1* | 12/2014 | Sherwood | C08K 3/36 428/429 |
| 2015/0002528 A1* | 1/2015 | Bohn | G02B 27/0172 345/589 |
| 2015/0029205 A1* | 1/2015 | Huang | G06T 5/007 345/589 |
| 2015/0036204 A1* | 2/2015 | Branda | G02B 5/23 359/244 |
| 2015/0070406 A1* | 3/2015 | Baek | G09G 3/3406 345/690 |
| 2015/0109651 A1* | 4/2015 | Branda | B60J 3/04 359/238 |
| 2015/0161933 A1* | 6/2015 | Wu | G09G 3/2011 345/690 |
| 2015/0192800 A1* | 7/2015 | Dirk | G02C 7/104 351/159.65 |
| 2015/0199934 A1* | 7/2015 | Kimura | G01J 1/32 345/690 |
| 2015/0243052 A1* | 8/2015 | Park | G09G 5/02 345/589 |
| 2015/0268396 A1* | 9/2015 | Weber | G02B 5/282 359/359 |
| 2015/0271481 A1* | 9/2015 | Guthrie | G09G 3/2003 382/154 |
| 2015/0277003 A1* | 10/2015 | Sanchez Ramos | A61B 3/1025 345/697 |
| 2015/0277123 A1* | 10/2015 | Chaum | G02B 27/0093 348/62 |
| 2015/0301407 A1* | 10/2015 | Chan | G02F 1/133603 349/64 |
| 2015/0308634 A1* | 10/2015 | van de Ven | G09F 9/33 362/84 |
| 2015/0312561 A1* | 10/2015 | Hoof | G02B 27/0172 348/46 |
| 2015/0350492 A1* | 12/2015 | Kurtz | G01J 3/465 345/591 |
| 2016/0065916 A1* | 3/2016 | Ishioka | G02B 5/201 359/891 |

(56) References Cited

U.S. PATENT DOCUMENTS

| | | | |
|---|---|---|---|
| 2016/0093268 A1* | 3/2016 | Shih | G09G 5/02 345/591 |
| 2016/0140913 A1* | 5/2016 | Aragane | G09G 3/3406 345/690 |
| 2016/0155390 A1* | 6/2016 | Son | G09G 3/3413 345/102 |
| 2016/0157828 A1* | 6/2016 | Sumi | G01N 29/0654 702/189 |
| 2016/0161801 A1* | 6/2016 | Watano | G02B 5/201 349/71 |
| 2016/0163774 A1* | 6/2016 | Shieh | H01L 27/322 257/40 |
| 2016/0189674 A1* | 6/2016 | Nishigaki | G09G 5/02 345/690 |
| 2016/0202814 A1* | 7/2016 | Lee | G06F 3/044 345/173 |
| 2016/0232828 A1* | 8/2016 | Jia | G09G 3/2003 |
| 2016/0240152 A1* | 8/2016 | Liu | G09G 3/2003 |
| 2016/0247457 A1* | 8/2016 | Kim | G09G 3/3291 |
| 2016/0252664 A1* | 9/2016 | Kim | G02B 5/282 359/359 |
| 2016/0268346 A1* | 9/2016 | Zeng | H01L 51/56 |
| 2016/0293139 A1* | 10/2016 | Kwon | G09G 5/02 |
| 2016/0300535 A1* | 10/2016 | Gilbert | G09G 3/36 |
| 2016/0322440 A1* | 11/2016 | Murata | G02B 27/017 |
| 2016/0349573 A1* | 12/2016 | Ohmuro | G02F 1/1336 |
| 2016/0351116 A1* | 12/2016 | Sun | H01L 27/3218 |
| 2016/0357076 A1* | 12/2016 | Huangfu | G02F 1/134336 |
| 2016/0372514 A1* | 12/2016 | Chang | H01L 27/1259 |
| 2016/0380238 A1* | 12/2016 | Ma | H01L 51/5275 257/40 |
| 2016/0381253 A1* | 12/2016 | Wang | H04N 1/6027 382/167 |
| 2017/0059930 A1* | 3/2017 | Wu | H01L 27/322 |
| 2017/0062477 A1* | 3/2017 | Su | H01L 27/124 |
| 2017/0068127 A1* | 3/2017 | Lee | G02F 1/133617 |
| 2017/0082892 A1* | 3/2017 | Chung | G02F 1/133514 |
| 2017/0090223 A1* | 3/2017 | Kim | G02F 1/1309 |
| 2017/0214863 A1* | 7/2017 | Narabu | G03B 15/00 |
| 2017/0235160 A1* | 8/2017 | Larson | G02C 7/104 351/45 |
| 2017/0242301 A1* | 8/2017 | Wan | G09G 3/3426 |
| 2017/0278444 A1* | 9/2017 | Tien | G09G 3/2003 |
| 2017/0278481 A1* | 9/2017 | Wang | G06T 19/006 |
| 2017/0285408 A1* | 10/2017 | Peng | G02F 1/133611 |
| 2017/0285418 A1* | 10/2017 | Tanaka | G02F 1/134336 |
| 2017/0288097 A1* | 10/2017 | Li | H01L 33/58 |
| 2017/0294175 A1* | 10/2017 | Chen | G09G 5/10 |
| 2017/0309235 A1* | 10/2017 | Garcia Manchado | G09G 3/3406 |
| 2017/0330501 A1* | 11/2017 | Kobayashi | G09G 3/2022 |
| 2017/0330518 A1* | 11/2017 | Lee | G09G 3/3291 |
| 2017/0345354 A1* | 11/2017 | Kawashima | G09F 9/30 |
| 2018/0003962 A1* | 1/2018 | Urey | G02B 27/0172 |
| 2018/0005005 A1* | 1/2018 | He | G06F 3/0412 |
| 2018/0007336 A1* | 1/2018 | Nikhara | H04N 5/23229 |
| 2018/0019384 A1* | 1/2018 | Abe | G02B 5/285 |
| 2018/0043130 A1* | 2/2018 | Moore-Ede | A61M 21/02 |
| 2018/0046021 A1* | 2/2018 | Li | G02B 27/0172 |
| 2018/0074322 A1* | 3/2018 | Rousseau | A61N 5/0618 |
| 2018/0088259 A1* | 3/2018 | Wu | G02B 5/20 |
| 2018/0095202 A1* | 4/2018 | Schmeder | G02B 5/201 |
| 2018/0097992 A1* | 4/2018 | Douady-Pleven | G06T 3/4015 |
| 2018/0106935 A1* | 4/2018 | Zhang | G02B 5/286 |
| 2018/0123067 A1* | 5/2018 | Sam | H01L 51/502 |
| 2018/0130446 A1* | 5/2018 | Guest | G09G 5/10 |
| 2018/0133504 A1* | 5/2018 | Malchano | A61B 5/16 |
| 2018/0144714 A1* | 5/2018 | Khorasani | G09G 5/02 |
| 2018/0158390 A1* | 6/2018 | Sanglimsuwan | G09G 3/003 |
| 2018/0166505 A1* | 6/2018 | Kajiyama | G02B 5/201 |
| 2018/0172509 A1* | 6/2018 | Yin | G01J 3/0218 |
| 2018/0203505 A1* | 7/2018 | Trail | G06F 3/013 |
| 2018/0204539 A1* | 7/2018 | Yang | G09G 3/2003 |
| 2018/0211593 A1* | 7/2018 | Zhang | G09G 3/3233 |
| 2018/0218656 A1* | 8/2018 | Richards | G09G 3/006 |
| 2018/0246598 A1* | 8/2018 | Sainis | G06F 3/044 |
| 2018/0292591 A1* | 10/2018 | Rao | G02F 1/133609 |
| 2018/0309980 A1* | 10/2018 | Ootsuki | A61B 3/13 |
| 2018/0321430 A1* | 11/2018 | Li | G02B 5/201 |
| 2018/0321510 A1* | 11/2018 | Vetro | G02B 1/116 |
| 2018/0321513 A1* | 11/2018 | Carrega | G02B 5/223 |
| 2018/0321514 A1* | 11/2018 | Carrega | G02B 1/116 |
| 2018/0341141 A1* | 11/2018 | Lin | G02F 1/133512 |
| 2018/0341146 A1* | 11/2018 | Banaei | G02F 1/133308 |
| 2018/0359434 A1* | 12/2018 | Tanaka | G02B 1/118 |
| 2019/0043844 A1* | 2/2019 | Liu | H01L 25/0753 |
| 2019/0064676 A1* | 2/2019 | Gruner | G02B 27/0025 |
| 2019/0073944 A1* | 3/2019 | Li | G09G 3/2003 |
| 2019/0098194 A1* | 3/2019 | Brick | G06K 9/00255 |
| 2019/0104246 A1* | 4/2019 | Antretter | G03B 7/16 |
| 2019/0123911 A1* | 4/2019 | Riley | H04L 9/0643 |
| 2019/0235675 A1* | 8/2019 | Wu | G06F 3/0412 |

OTHER PUBLICATIONS

ViewSonic Corporation, "Blue Light Filter—Protect Your Eyes Without Compromising Colour and Viewing Enjoyment", 2000-2017, 19 pages.

* cited by examiner

METHOD AND APPARATUS FOR COLOR-PRESERVING SPECTRUM RESHAPE

RELATED APPLICATION

The present application claims priority from U.S. Provisional Patent Application No. 62/300,794, filed Feb. 27, 2016, the content of which is incorporated by reference in its entirety herein.

TECHNICAL FIELD

This disclosure relates to display devices and, in particular, to methods and apparatus to reduce the amount of harmful blue light while preserving the color fidelity of the display devices.

BACKGROUND

A plethora of health issues may occur when human eyes are exposed to blue light for an extended period of time. For example, long absorption of blue light around the wavelength of 482 nm at night by the light sensitive cells called "intrinsically photosensitive retinal ganglion cells" (ip-RGCs) on human retina can cause harmful changes to the human circadian clock. The harmful effects may include insomnia and low sleep quality. Blue light at the high energy wavelengths (380-420 nm) can cause other types of health issues as well. Although simply applying a blue light blocker to a display device can reduce the harmful blue light, the blue light blocker adversely generates unpleasant yellowish and/or pinkish effects on the display. The degradation of image quality is undesirable for commercial products such as, for example, TVs, smartphones, and computers.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a system including an light emitter to generate a primary light, a filter to filter the primary light to substantially remove a spectrum energy in a wavelength band, a display device to present visual content using the filtered primary light, and a processing device to receive a visual content, calculate, in view of the filtered primary light, a metamer of the visual content, and provide, to the display device, the metamer of the visual content to display in view of the filtered light.

Implementations of the present disclosure may include a method including receiving, by a processing device, a visual content to be displayed on a display device, filtering a primary light, emitted from a light source associated with the display device, to substantially remove a spectrum energy in a wavelength band, calculating, in view of the filtered primary light, a metamer of the visual content, and providing, to the display device, the metamer of the visual content to display in view of the filtered light.

Implementations of the disclosure may include a machine-readable non-transitory storage medium storing instructions which, when executed, cause a processing device to perform operations including receiving, by the processing device, a visual content to be displayed on a display device, wherein a primary light associated with the display device is filtered to substantially remove a spectrum energy in a wavelength band, calculating, in view of the filtered primary light, a metamer of the visual content, and providing, to the display device, the metamer of the visual content to display in view of the filtered light.

BRIEF DESCRIPTION OF THE DRAWINGS

The patent or application file contains at least one drawing executed in color. Copies of this patent of patent application publication with color drawing(s) will be provided by the Office upon request and payment of the necessary fee.

The present disclosure is illustrated by way of example, and not by way of limitation, in the figures of the accompanying drawings.

FIGS. 4A-4C illustrate the effects of blue light blocker and color compensation according to an implementation of the present disclosure.

DETAILED DESCRIPTION

To correct the above-noted and other deficiencies of existing systems, implementations of the present disclosure provide systems and methods that reduce the spectrum energy of the harmful blue light while preserving the overall color fidelity of a visual content (e.g., image or video) presented on a display device. Implementations of the present disclosure include a combination of blue light blocking filter (referred to as blue light blocker) that may remove the spectrum energy within a selected wavelength band (e.g., the blue light band) and a color compensation processor to correct color distortions. It should be understood that implementations of the disclosure can be applied to any targeted wavelength bands including those other than the blue light band. The blue light blocker is applied to a light source of the display device while the color compensation is applied to the pixel values of the visual content. The combination of the blue light blocker and the color compensation may result in displaying a metamer of the input visual content on the display device, where the metamer is perceived by an average human observer substantially identical as the input visual content but with substantially reduced harmful blue light spectrum energy.

In this disclosure, a display device is a visual output device including suitable types of control circuits and display panels to present colored visual content, where the display panels include, but not limited to, liquid crystal display (LCD) panels, light-emitting diode display (LED) panels, and organic light-emitting diode display (OLED) panels. These display panels can be used in any suitable types of apparatus including, but not limited to, television sets (TVs), computer monitors, mobile phone (e.g., smart phone) screens, head-mounted displays, large format screens (e.g., movie screens), and medical device monitors. The display device can present two-dimensional visual content on a flat (or slightly curved) display panels or three-dimensional visual content in a virtual reality environment.

Figure 1:
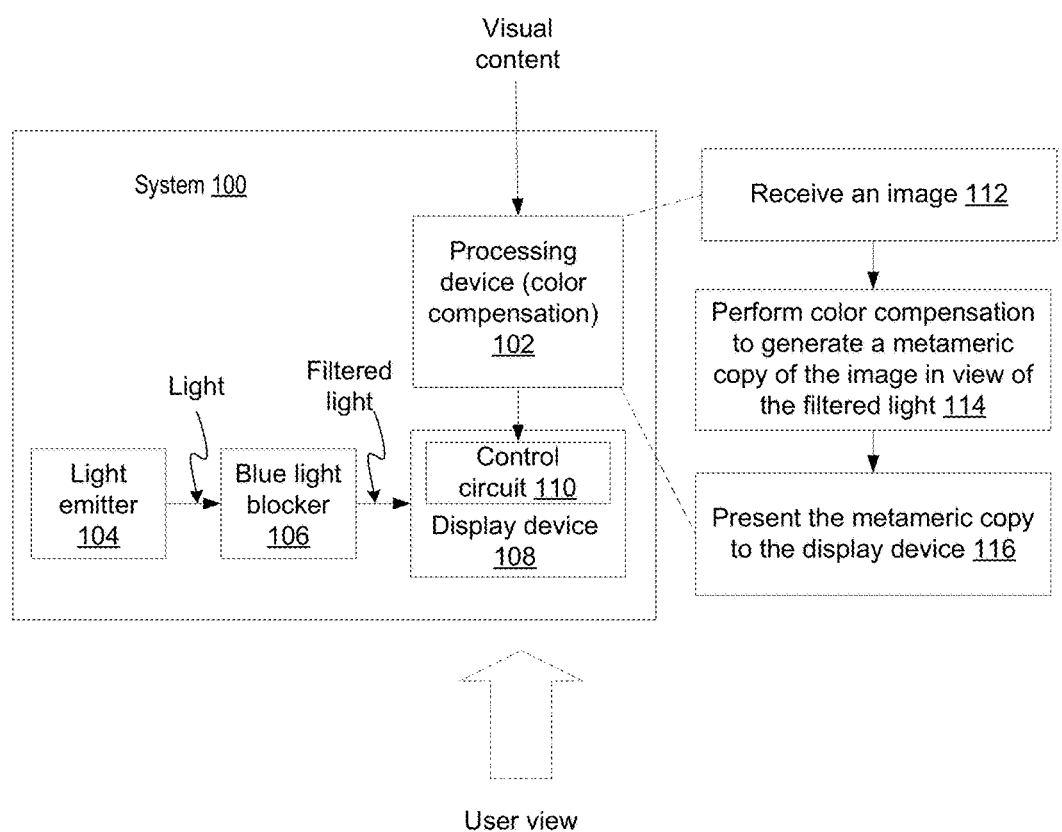
FIG. 1 illustrates a system according to an implementation of the present disclosure.

FIG. 1 illustrates a system 100 according to an implementation of the present disclosure. System 100 can be suitable hardware devices including such as, for example, television sets (TVs), computer monitors, mobile phone (e.g., smart phone) screens, head-mounted displays, large format screens (e.g., movie screens), and medical device monitors. As shown in FIG. 1, system 100 may include a processing device 102, a light emitter 104, a blue light blocker 106, and a display device 108. In one implementation, display device 108 may further include control circuit 110 to drive one or more display panels.

Processing device 102 can be a general-purpose processor such as, for example, a central processing unit (CPU) or a graphic processing unit (GPU) that can be programmed to perform the color compensation. Alternatively, processing device 102 can be an application-specific integrated circuits (ASICs) implementing the color compensation. In one implementation, processing device 102 may receive visual content (e.g., images or videos) stored in a memory (not shown) in system 100. In another implementation, processing device 102 may receive visual content from a content source external to system 100. The visual content may be represented by an array of pixel values defined according to an image representation format. For example, an image can be represented by a two-dimensional array of pixels, and a video can be represented by a stack of two-dimensional arrays of pixels. Each pixel value may include a red color intensity value (R), a green color intensity value (G), and a blue color intensity value (B) in the RGB format.

Light emitter 104 may include hardware components to generate three primary color light sources (referred to as the primaries) including a red light source (r), a green light source (g), and a blue light source (b). Control circuit 110 may modulate the intensities of different light sources based on the pixel values of the visual content to generate the visual display on the display panel in display device 108. In one implementation (e.g., LCDs), light emitter 104 may be a light source generator separate from display device 108. In another implementation (e.g., OLEDs), light emitter 104 may be an integral part of display device 108 (e.g., as a layer in the OLED panel). In some implementations, the primaries associated with display device 108 are designed according to a fixed protocol. Thus, the blue primary light source cannot be changed. A blue light blocker 106, therefore, may be used to reduce the spectrum energy of blue light in targeted wavelength bands.

Blue light blocker 106 can be a hardware filter that substantially removes the spectrum energy in one or more targeted wavelength bands, where a wavelength band can be in the blue light wavelength section. Blue light blocker 106 may perform the filtering at light emitter 104, on the light path between light emitter 104 and display device 108, or at the receiver (e.g., the viewer).

For example, light blocker 106 can be a logic circuit or a coating material (e.g., a semiconductor material that can selectively block a wavelength band) in light emitter 104 to directly remove the blue light spectrum energy in the emitted primaries. In another example, light blocker 106 can be a glass coated with chemical agents to selectively filter out the spectrum energy in the targeted blue light wavelength bands. The blue light blocker 106 in the form of coated glass can be placed in the light path between light emitter 104 and display device 108. In yet another example, the blue light blocker 106 can be part of a head-mounted device (e.g., a pair of wearable glasses coated with filtering agents).

Blue light blocker 106 may filter the primary light sources generated from light emitter 104 to produce filtered primary light sources. Without color compensation, the display of the visual content in view of the filtered primary light sources is distorted with the unpleasant yellowish and/or pinkish effects. To compensate the effects due to the blue light blocker 106, processing device may perform color compensation to the input visual content and display the color-compensated visual content on display device 108. To perform the color compensation, processing device 102 may, at 112, receive the visual content from a memory or from an external content source. Processing device 102 may, at 114, perform color compensation to generate a metamer of the input visual content in view of the filtered light. Processing device 102 may, at 116, present the metamer of the visual content to display device 108. Thus, the displayed visual content generated by system 100 may be a metamer of the input visual content that induces minimum harmful perceptual response (e.g., ipRGC response) from human observers.

Following sections include exemplary implementations of the blue light blocker and color compensation.

Blue Light Blocker

Display device 108 may be associated with a display gamut volume which includes all the colors that the display device 108 can reproduce. When the blue light blocker is applied to the primary light sources, the number of colors can be reproduced by display device 108 may reduce, thus resulting in a smaller display gamut volume. Implementation of the present disclosures include a blue light blocker that is designed to minimize both the spectrum energy in the blue light wavelength band and the reduction of the display gamut volume. In particular, the blue light blocker is to minimize a weighted sum of the spectrum energy in the blue light wavelength band and maximize the display gamut volume.

Given the RGB values (R, G, B) of a pixel, the emission spectrum d(k) of the pixel can be described as $$d(\lambda) = t_R(R)r(\lambda) + t_G(G)g(\lambda) + t_B(B)b(\lambda), \quad (1)$$

where $t_R(\cdot)$, $t_G(\cdot)$, and $t_B(\cdot)$ denote the luminance transfer functions of the display for R, G, and B channels, respectively, and $r(\lambda)$, $g(\lambda)$, and $b(\lambda)$ are the spectra of the three corresponding display primaries. In some implementations, $t_R(\cdot)$, $t_G(\cdot)$, and $t_B(\cdot)$ can be modeled as gamma functions. After applying a blue light blocker with spectral transmittance function $F(\lambda)$ to the primaries, the emission spectrum is $F(\lambda)d(\lambda)$. The colors that an average human observer can perceive can be represented in an XYZ space (X, Y, Z). Using color matching functions $(x(\lambda), y(\lambda), z(\lambda))$, the RGB values of a pixel may be converted into XYZ values as follows:

$$\begin{bmatrix} X \\ Y \\ Z \end{bmatrix} = \begin{bmatrix} <Fd, x> \\ <Fd, y> \\ <Fd, z> \end{bmatrix} = \quad (2)$$

$$\begin{bmatrix} <Fr,x> & <Fg,x> & <Fb,x> \\ <Fg,y> & <Fg,y> & <Fb,y> \\ <Fb,z> & <Fg,z> & <Fb,z> \end{bmatrix} \begin{bmatrix} t_R(R) \\ t_G(G) \\ t_B(B) \end{bmatrix} = H_F \begin{bmatrix} R_L \\ G_L \\ B_L \end{bmatrix},$$

where $<\cdot, \cdot>$ is the inner product of two functions within a targeted wavelength band (e.g., the visible light wavelength range of 400 nm-700 nm), $(R_L, G_L, B_L)$ denotes the linearized RGB values (which are computed using the luminance transfer functions $(t_R(\cdot), t_G(\cdot), t_B(\cdot))$, and $H_F$ denotes the transfer matrix from the linearized RGB value space to the XYZ value space. The subscript F indicates that the transfer matrix is determined by the spectral transmittance function $F(\lambda)$ of the blue light blocker. The display gamut D is the set of all displayable XYZ values, i.e., those XYZ values corresponding to all linearized RGB values within the RGB space range. The display gamut volume can be determined by $$\|D\|=det(H_F), \quad (3)$$

where $det(\cdot)$ is the determinant operator.

With respect to a spectral sensitivity profile $m(\lambda)$ of retina cells (e.g., ipRGC), the response I induced by $F(\lambda)d(\lambda)$ of the blue light blocker can be represented by $$I=<Fd,m>=v_F(R_L G_L B_L) \quad (4)$$

where, assuming that the expected values of $R_L, G_L, B_L$ are the same, $v_F$ represents perceived spectrum energy of the light. The blue light blocker function $F(\lambda)$ can be designed by solving the following optimization problem $$\underset{F(\lambda)}{\operatorname{argmin}}(-(det(H_F)^2 + w_I\|v_F\|_2^6), \quad (5)$$

subject to: $0 \le F(\lambda) \le 1$, $\forall \lambda \in [fb_{lo}, fb_{hi}]$, where $w_I$ is a weight parameter, $\|\cdot\|_2$ is the L2 norm, $fb_{lo}$ is the lower wavelength bound of the blue light blocker, and $fb_{hi}$ is the higher wavelength bound of the blue light blocker. In one implementation, the lower bound is approximately 400 nm, and the higher bound is approximately 700 nm, where the lower and higher bounds approximately match the wavelength range of visible light. Thus, the blue light blocker can be designed to maximize the display gamut volume while minimizing the blue light spectrum energy perceived by ipRGC. The larger display gamut volume as a result of solving the optimization problem can provide more colors for the color compensation to choose and help restore the color fidelity of the display after the filtering primaries by blue light blocker 106.

The optimization problem as shown in Equation (5) can be solved using a suitable optimization solver such as, for example a gradient descent approach. For example, $F(\lambda)$ can be represented by uniform samples $F_1, F_2, \ldots, F_n$ within the band of $[fb_{lo}, fb_{hi}]$. These samples $F_1, F_2, \ldots, F_n$ can be derived by solving the optimization problem using the gradient descent method.

Figure 2:
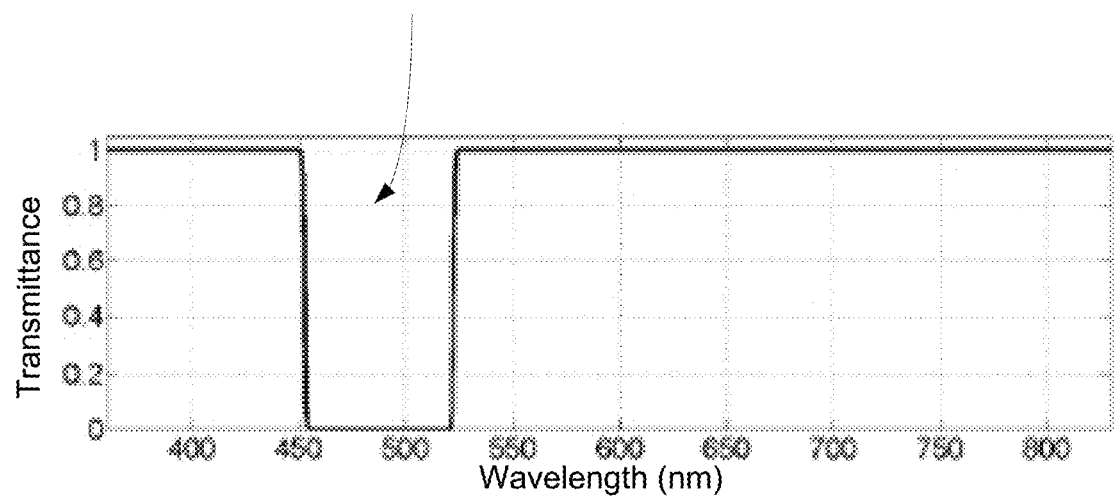
FIG. 2 illustrates the spectral transmittance profile of a resulting blue light blocker according to an implementation of the present disclosure.

FIG. 2 illustrates the spectral transmittance profile 200 of a resulting blue light blocker according to an implementation of the present disclosure. The blue light blocker, as shown in FIG. 2, includes a stop band 202 to remove spectrum energy from approximately 450 nm to 525 nm. The stop band 202 may effectively remove blue light to which the ipRGC is sensitive. Once the spectrum distribution of the blue light blocker is determined, a hardware light filter can be manufactured with substantially the same spectrum distribution.

In addition to the stop band designed to block blue light generating responses on ipRGC, the blue light blocker can be designed to block other bands of wavelengths. For example, the blue light blocker can have a stop band to remove the spectrum energy in the ultraviolet wavelength range or other color wavelength range. In another implementation, the blue light blocker can have multiple stop bands that may remove spectrum energy from multiple wavelength ranges.

Color Compensation

Blue light blocker, when applied alone without color compensation, may produce unpleasant visual effects. Implementations of present disclosure apply color compensation to the pixel values, producing a metamer of the input visual content that can be displayed, in view of the filtered primary light sources, on display device 108 with sufficient color fidelity. In one implementation, the color compensation may include determining whether a pixel value falls within the display gamut volume. Responsive to determining that the pixel value falls within the display gamut volume, the XYZ value of the pixel is preserved. Responsive to determining that the pixel value is outside the display gamut volume, the hue and saturation value of the pixel are preserved while compressing the lightness value of the pixel.

Figure 3:
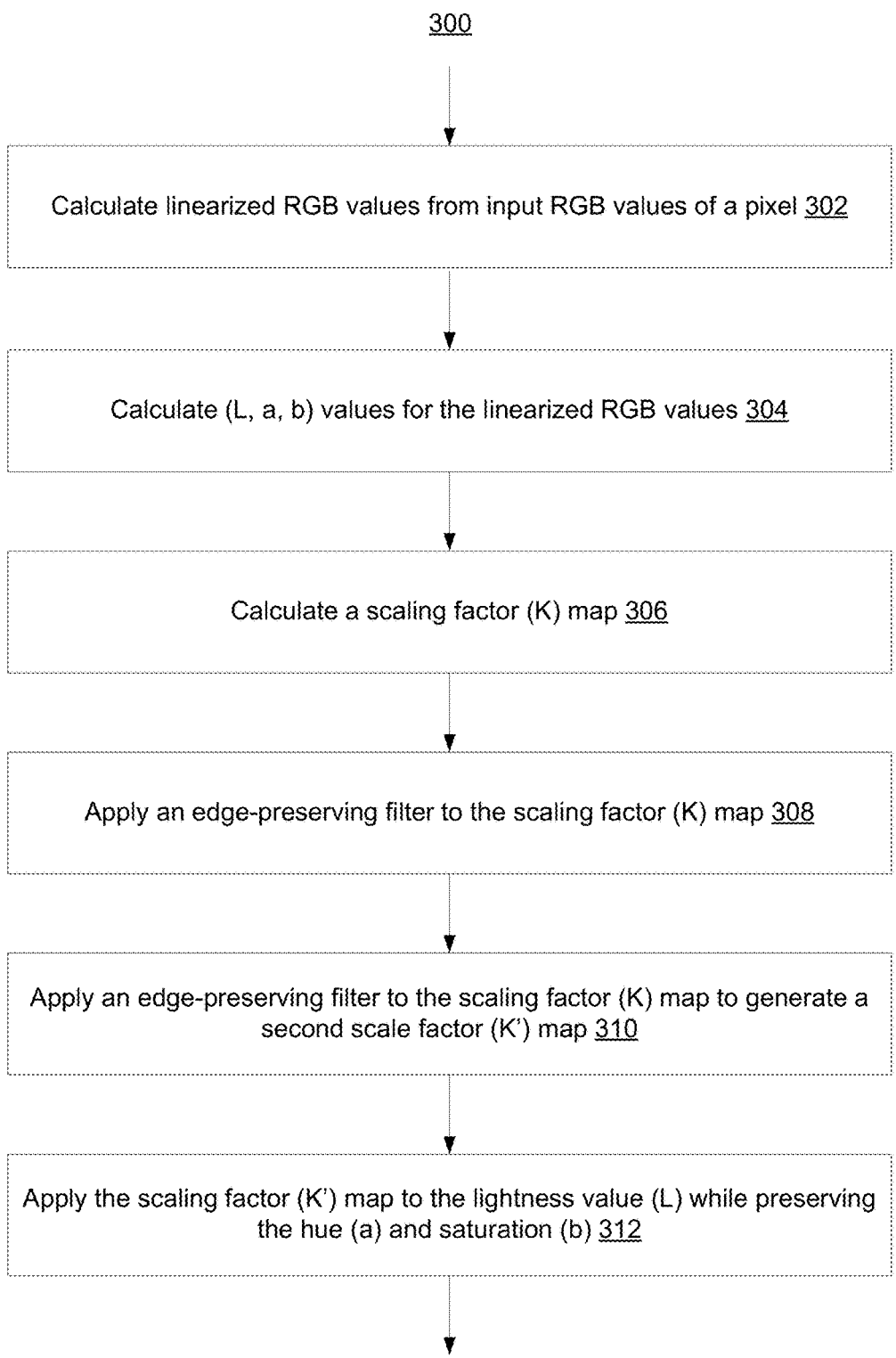
FIG. 3 illustrates a flow diagram of a method to perform color compensation according to an implementation of the present disclosure.

FIG. 3 illustrates a flow diagram of a method 300 to perform color compensation according to an implementation of the present disclosure. The method may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the methods may be performed by processing device 102 as shown in FIG. 1.

Referring to FIG. 1, at 302, processing device 102 may first calculate the linearized RGB values from the RGB values for pixels of an input content using the luminance transfer functions as:

$$(R_{o,L}, G_{o,L}, B_{o,L})=(t_R(R_0), t_G(G_0), t_B(B_0)), \quad (6)$$

where $(R_o, G_o, B_o)$ are the original RGB values, $(R_{o,L}, G_{o,L}, B_{o,L})$ are the linearized RGB values, and $(t_R(\cdot), t_G(\cdot), t_B(\cdot))$ are the luminance transfer functions. To generate the metamer of the original visual content, the eventual compensated RGB values $(R_{c,L}, G_{c,L}, B_{c,L})$, when shown on display device 108 using blue light blocker 106, should be identical or substantially identical to the original pixel. In practice, however, after applying a forward transformation using the transfer matrix without the blue light blocker and then applying an inverse transformation using the transfer matrix with the blue light blocker to the linearized RGB values, the resulting RGB value can be out of the RGB value range (e.g., [0, 1]), indicating that a matching XYZ values may not exist due to the limited display gamut volume. These out-of-gamut pixels cannot be displayed on display device 108.

Implementations of the present disclosure may identify an in-gamut match for the out-of-gamut pixel. The in-gamut matching pixel may have identical hue value and saturation value as the out-of-gamut pixel, but a compressed lightness value. The in-gamut matching pixel may be used to replace the corresponding out-of-gamut pixel. To this end, at 304, processing device may further calculate the CIELAB color space representation of a pixel. The CIELAB color space representation includes the perceptual attributes (L, a, b) from which lightness value (e.g., using L), hue value (e.g., using a and b), and saturation value (e.g., using a and b) can be derived. The LAB values ($L_o$, $a_o$, $b_o$) are obtained by $$[L_o a_o b_o]^T = \hat{}(H[R_{o,L} G_{o,L} B_{o,L}]^T \quad (7)$$

where $\hat{}$ is the transformation matrix between the XYZ space to the CIELAB space, and H represents the transfer matrix from the RGB space to the XYZ space without using the blue light blocker 106.

At 306, processing device 102 may calculate a scaling factor (K) map which is a two-dimensional array with the same size as the pixel array. Each data point in the scaling factor map is a scaling factor (K) that is to be applied to the lightness value (L) of the corresponding pixel. The scaling factor (K) and the compensated RGB values can be calculated as:

$$\operatorname*{argmax}_{K} K, \text{ subject to: } \begin{bmatrix} K \leq 1 \\ R_{c,L}, G_{c,L}, B_{c,L} \leq 1 \end{bmatrix}, \quad (8)$$

$$\text{where, } [R_{c,L} \ G_{c,L} \ B_{c,L}]^T = H_F^{-1} \wedge^{-1} ([KL_o a_o \ b_o]^T). \quad (9)$$

Processing device 102 may apply the scaling factor K to each pixel as shown in Equation (9). The application of the scaling factor (K) ensures that the compensated RGB values ($R_{c,L}$, $G_{c,L}$, $B_{c,L}$) are in the display gamut volume of display device 108.

In one implementation, the application of the scaling factor (K) directly to the lightness may result in degradation of details in the displayed visual content. To improve the display quality, at 310, processing device 102 may optionally apply an edge preserving filter or a low-pass filter to the scaling factor (K) map to generate a second scaling factor (K') map. At 312, processing device 102 may apply the second scaling factor (K') to the lightness value in each pixel, resulting in a metamer of the visual content input. After scaling, processing device 102 may convert the scaled CIELAB values (K'$L_o$, $a_o$, $b_o$) back to the linearized RGB values and then RGB values using the luminance transfer functions $@_B(\bullet)$, $t_G(\bullet)$, $t_B(\bullet)$.

One aspect of the color compensation in this disclosure is that the color compensation does not shift the "white point" of the display device. A "white point" of a display device is the color that serves to define the white color. Since the color compensation as described in the disclosure maintains the hue of pixels, the "white point" of the display device is also preserved. An invariant "white point" after color compensation may help prevent the occurrence of the unpleasant color-shifting problem.

Experiment Results

FIGS. 4A-4C illustrate the effects of blue light blocker and color compensation according to an implementation of the present disclosure. FIG. 4A illustrates an original image; FIG. 4B illustrates the effect of applying the blue light blocker alone to the original image; FIG. 4C illustrates the effect of applying both the blue light blocker and the color compensation to the original image. As shown in FIG. 4B, the application of blue light blocker may produce the unpleasant yellowish/pinkish effects on the display. As shown in FIG. 4C, the combination of blue light blocker and color compensation as described in this disclosure may produce a display with color fidelity of the original image.

Figures 5A, 5B:
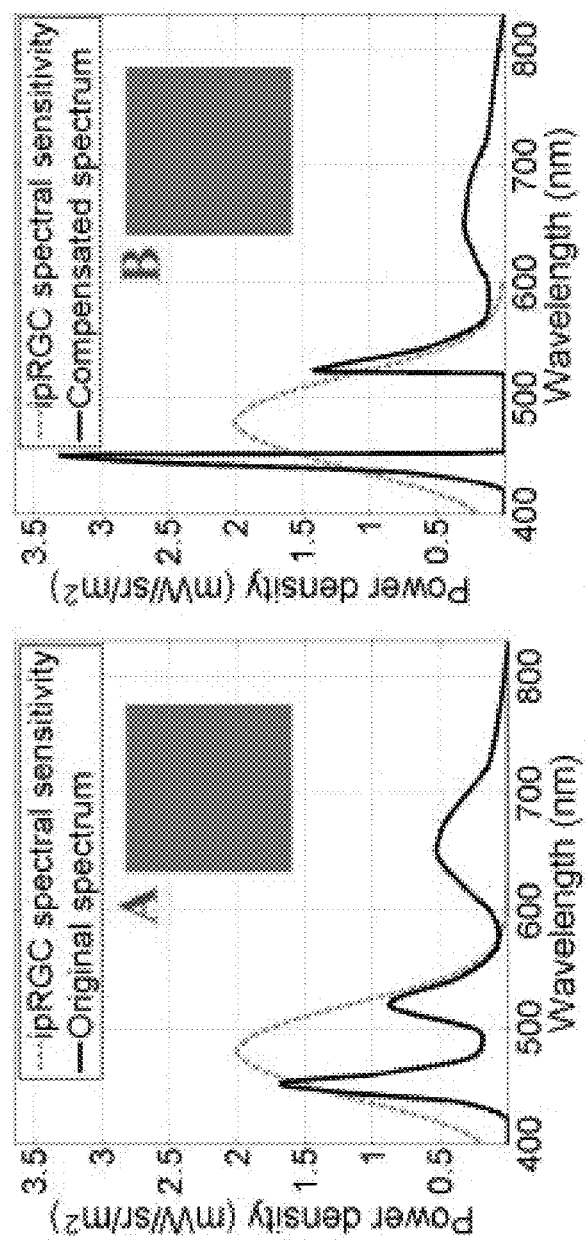
FIGS. 5A-5B illustrate the spectrum energy for blue color areas according to an implementation of the present disclosure.

FIGS. 5A-5B illustrate the spectrum energy for blue color areas according to an implementation of the present disclosure. As shown in FIGS. 5A-5B, the blue area B in FIG. 5B has almost no power in the sensitive band for ipRGC. In contrast, the blue area A in FIG. 5A has significant power in the sensitive band for ipRGC. Thus, the combination of the blue light blocker and the color compensation may help substantially eliminate the spectrum energy of in targeted wavelength bands while preserving the color fidelity of the visual display.

Figure 6:
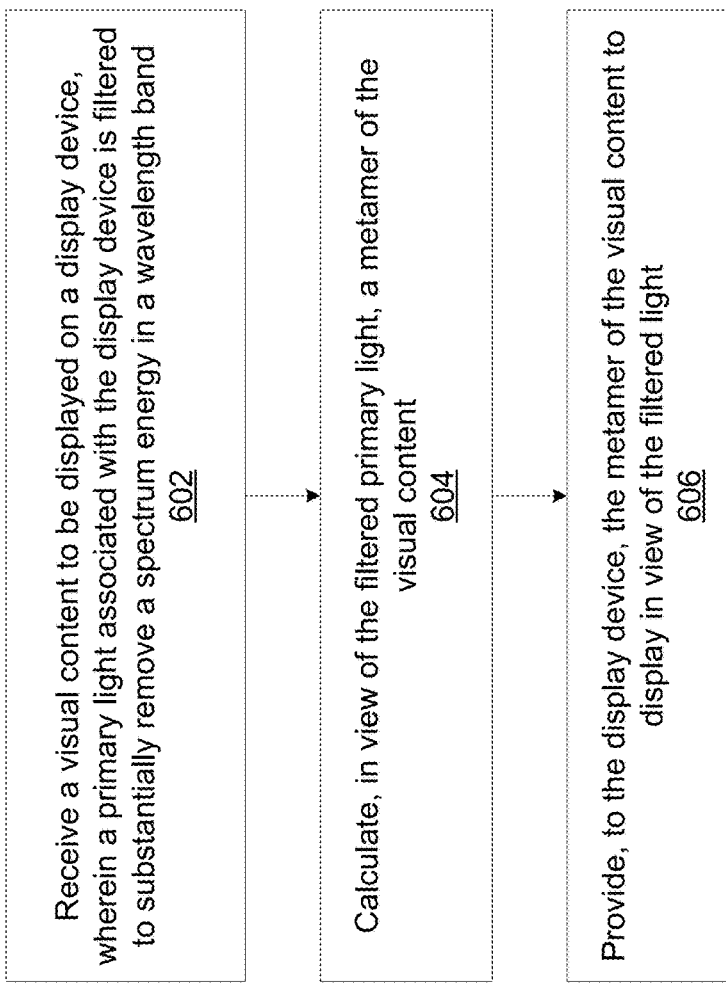
FIG. 6 illustrates a flow diagram of a method to perform color-preserving spectrum reshaping according to an implementation of the disclosure.

FIG. 6 illustrates a flow diagram of a method 600 to perform color-preserving spectrum reshaping according to an implementation of the disclosure.

At 602, the processing device may receive, by the processing device, a visual content to be displayed on a display device, wherein a primary light associated with the display device is filtered to substantially remove a spectrum energy in a wavelength band.

At 604, the processing device may calculate, in view of the filtered primary light, a metamer of the visual content.

At 606, the processing device may provide, to the display device, the metamer of the visual content to display in view of the filtered light.

Figure 7:
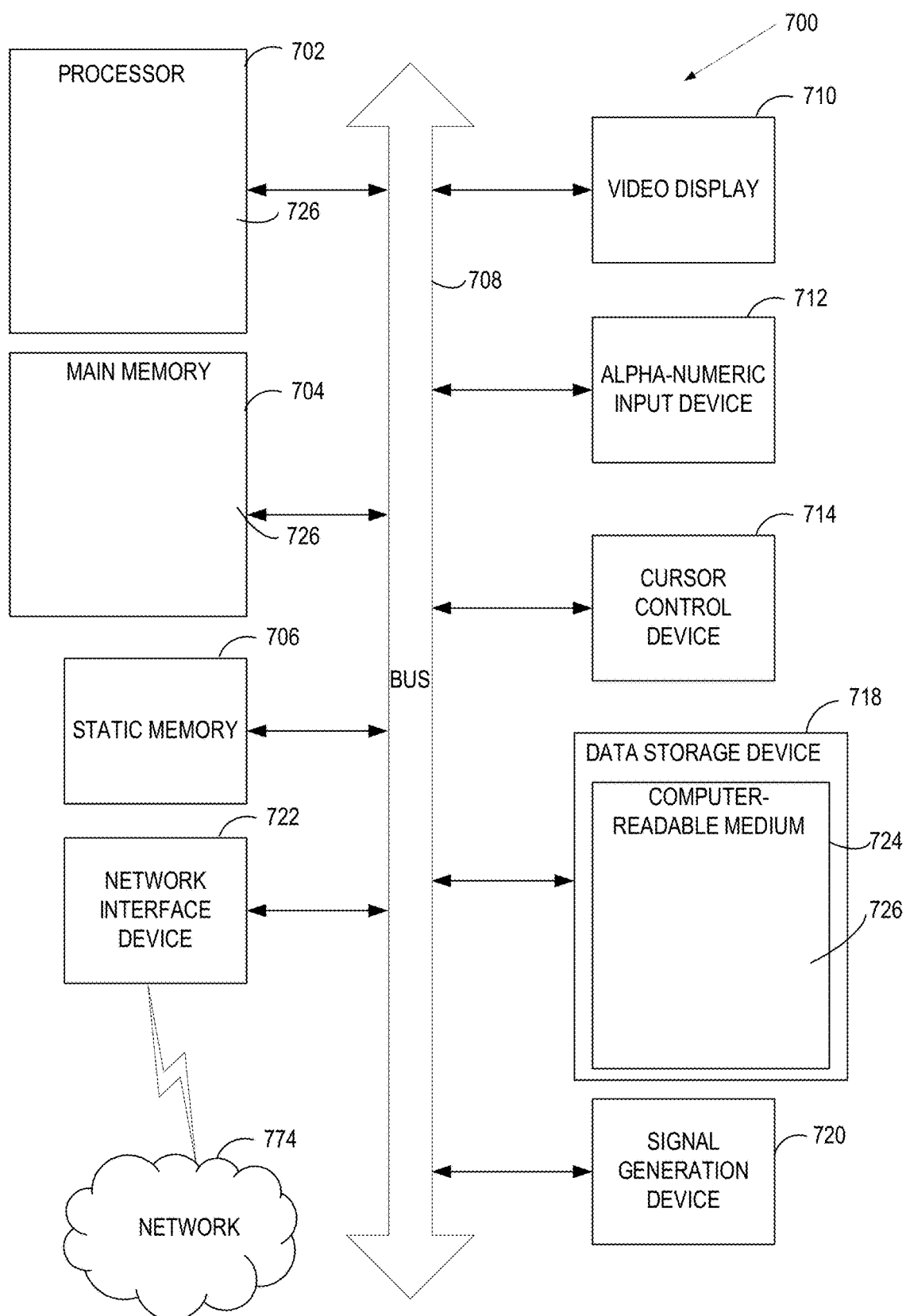
FIG. 7 is a block diagram illustrating an exemplary computer system, according to some implementations of the disclosure.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein (e.g., instructions of the annotation subsystem 112). The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "calculating", "applying", "determining", "identifying," "providing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
a light emitter to generate a primary light comprising at least three primary colors;
an optical light blocker, wherein the optical blocker is to optically filter the primary light to remove a substantial portion of spectrum energy within a wavelength band corresponding to a color of the primary light and to substantially preserve the spectrum energy outside the wavelength band;
a display device to present a visual content using the optically filtered primary light; and
a processing device to:
receive the visual content;
calculate, taking into account an effect of the optically filtered primary light on color appearance, a metamer of the visual content to compensate for the effect of the optically filtered primary light, wherein the calculated metamer when presented on the display device substantially preserves color appearance of the visual content rendered on the display device and substantially preserves hue of the visual content by means of digital image processing that compensates for the effect of the optically filtered primary light on the color appearance, and wherein taking into account an effect of the optically filtered primary light on color appearance comprises taking into account of a spectral sensitivity profile associated with retina cells, an emission spectrum associated with a pixel, and a spectral transmittance function corresponding to the color of the primary light; and
provide, to the display device, the metamer of the visual content to display using the optically filtered light.

2. The system of claim 1, wherein the optical light blocker is to remove the substantial portion of the spectrum energy within a wavelength band between 400 nanometer (nm) and 700 nm.

3. The system of claim 1, wherein the display device comprises at least one of a liquid crystal display (LCD) panel, a light-emitting diode display (LED) panel, or an organic light-emitting diode display (OLED) panel.

4. The system of claim 1, wherein the optical light blocker comprises glass coated with a chemical agent, and wherein the optical light blocker is to remove the substantial portion of the spectrum energy within the wavelength band and maximize a display gamut volume associated with the display device in view of the optically filtered primary light.

5. The system of claim 4, wherein to calculate the metamer, the processing device is further to:
determine, in view of the optically filtered primary light, whether a first pixel of the visual content is within the display gamut volume;
responsive to determining that the first pixel is outside the display gamut volume,
identify a second pixel within the display gamut volume, wherein the second pixel comprises an identical hue value and an identical saturation value as the first pixel but a scaled lightness value of the first pixel; and
replace the first pixel with the second pixel.

6. The system of claim 5, wherein to calculate the metamer, the processing device is further to:
apply one of an edge-preserving filter or a low-pass filter to a scale factor map comprising a plurality of scale factors to generate a second scale factor; and
use the second scale factor to scale a lightness value of the first pixel.

7. The system of claim 1, wherein calculation of the metamer preserves a white point of the display device.

8. The system of claim 1, wherein the optical light blocker is further to substantially remove the spectrum energy in a second wavelength band.

9. The system of claim 1, wherein the optical light blocker is designed to maximize a display gamut associated with the display device while minimizing the spectrum energy within the wavelength band of the color received by the retina cells using an optimization solver.

10. The System of claim 9, wherein the optimization solver is a gradient descent solver.

11. A method comprising:
receiving, by a processing device, a visual content to be displayed on a display device;
applying an optical light blocker, wherein the optical blocker is to optically filter a primary light comprising at least three primary colors, emitted from a light source associated with the display device, to remove a substantial portion of spectrum energy within a wavelength band corresponding to a color of the primary light and to substantially preserve the spectrum energy outside the wavelength band;
calculating, taking into account an effect of the optically filtered primary light on color appearance, a metamer of the visual content to compensate for the effect of the optically filtered primary light, wherein the calculated metamer when presented on the display device substantially preserves color appearance of the visual content rendered on the display device and substantially preserves hue of the visual content by means of digital image processing that compensates for the effect of the optically filtered primary light on the color appearance, and wherein taking into account an effect of the optically filtered primary light on color appearance comprises taking into account of a spectral sensitivity profile associated with retina cells, an emission spectrum associated with a pixel, and a spectral transmittance function corresponding to the color of the primary light; and
providing, to the display device, the metamer of the visual content to display using the optically filtered light.

12. The method of claim 11, wherein to optically filter the primary light is to remove the substantial portion of the spectrum energy within a wavelength band between 400 nanometer (nm) and 700 nm.

13. The method of claim 11, wherein the display device comprises at least one of a liquid crystal display (LCD) panel, a light-emitting diode display (LED) panel, or an organic light-emitting diode display (OLED) panel.

14. The method of claim 11, wherein to optically filter the primary light is to remove the substantial portion of the spectrum energy within the wavelength band and maximize a display gamut volume associated with the display device in view of the optically filtered primary light.

15. The method of claim 14, wherein the calculating the metamer further comprises:
determining, in view of the optically filtered primary light, whether a first pixel of the visual content is within the display gamut volume;
responsive to determining that the first pixel is outside the display gamut volume, identifying a second pixel within the display gamut volume, wherein the second pixel comprises an identical hue value and an identical saturation value as the first pixel but a scaled lightness value of the first pixel; and replacing the first pixel with the second pixel.

16. The method of claim 15, wherein the calculating the metamer further comprises:

applying one of an edge-preserving filter or a low-pass filter to a scale factor map comprising a plurality of scale factors to generate a second scale factor; and using the second scale factor to scale a lightness value of the first pixel.

17. The method of claim 11, wherein calculation of the metamer preserves a white point of the display device.

18. A non-transitory machine-readable storage medium storing instructions which, when executed, cause a processing device to perform operations comprising:

receiving, by the processing device, a visual content to be displayed on a display device, wherein the display device is associated with a primary light comprising at least three primary colors, wherein the primary light is optically filtered by an optical light blocker, and wherein the optical blocker is to remove a substantial portion of a spectrum energy within a wavelength band corresponding to a color of the primary light and to substantially preserve the spectrum energy outside the wavelength band;

calculating, taking into account an effect of the optically filtered primary light on color appearance, a metamer of the visual content to compensate for the effect of the optically filtered primary light, wherein the calculated metamer when presented on the display device substantially preserves color appearance of the visual content rendered on the display device and substantially preserves hue of the visual content by means of digital image processing that compensates for the effect of the optically filtered primary light on the color appearance, and wherein taking into account an effect of the optically filtered primary light on color appearance comprises taking into account of a spectral sensitivity profile associated with retina cells, an emission spectrum associated with a pixel, and a spectral transmittance function corresponding to the color of the primary light; and providing, to the display device, the metamer of the visual content to display using the optically filtered light.

19. The non-transitory machine-readable storage medium of claim 18, wherein the primary light is optically filtered to remove the substantial portion of the spectrum energy within a wavelength band between 400 nanometer (nm) and 700 nm.

20. The non-transitory machine-readable storage medium of claim 18, wherein the display device comprises at least one of a liquid crystal display (LCD) panel, a light-emitting diode display (LED) panel, or an organic light-emitting diode display (OLED) panel.

21. The non-transitory machine-readable storage medium of claim 18, wherein the primary light is filtered to remove the substantial portion of the spectrum energy within the wavelength band and maximize a display gamut volume associated with the display device in view of the optically filtered primary light.

22. The non-transitory machine-readable storage medium of claim 21, wherein the calculating the metamer further comprises:

determining, in view of the optically filtered primary light, whether a first pixel of the visual content is within the display gamut volume;

responsive to determining that the first pixel is outside the display gamut volume, identifying a second pixel within the display gamut volume, wherein the second pixel comprises an identical hue value and an identical saturation value as the first pixel but a scaled lightness value of the first pixel; and replacing the first pixel with the second pixel.

* * * * *